Figure 1:

April 13, 1965  R. H. VARIAN ETAL  3,178,636
MAGNETIC FIELD MEASURING METHODS AND APPARATUS
Filed Aug. 14, 1956   2 Sheets-Sheet 1

INVENTORS.
Russell H. Varian &
John M. Drake
BY

Attorney

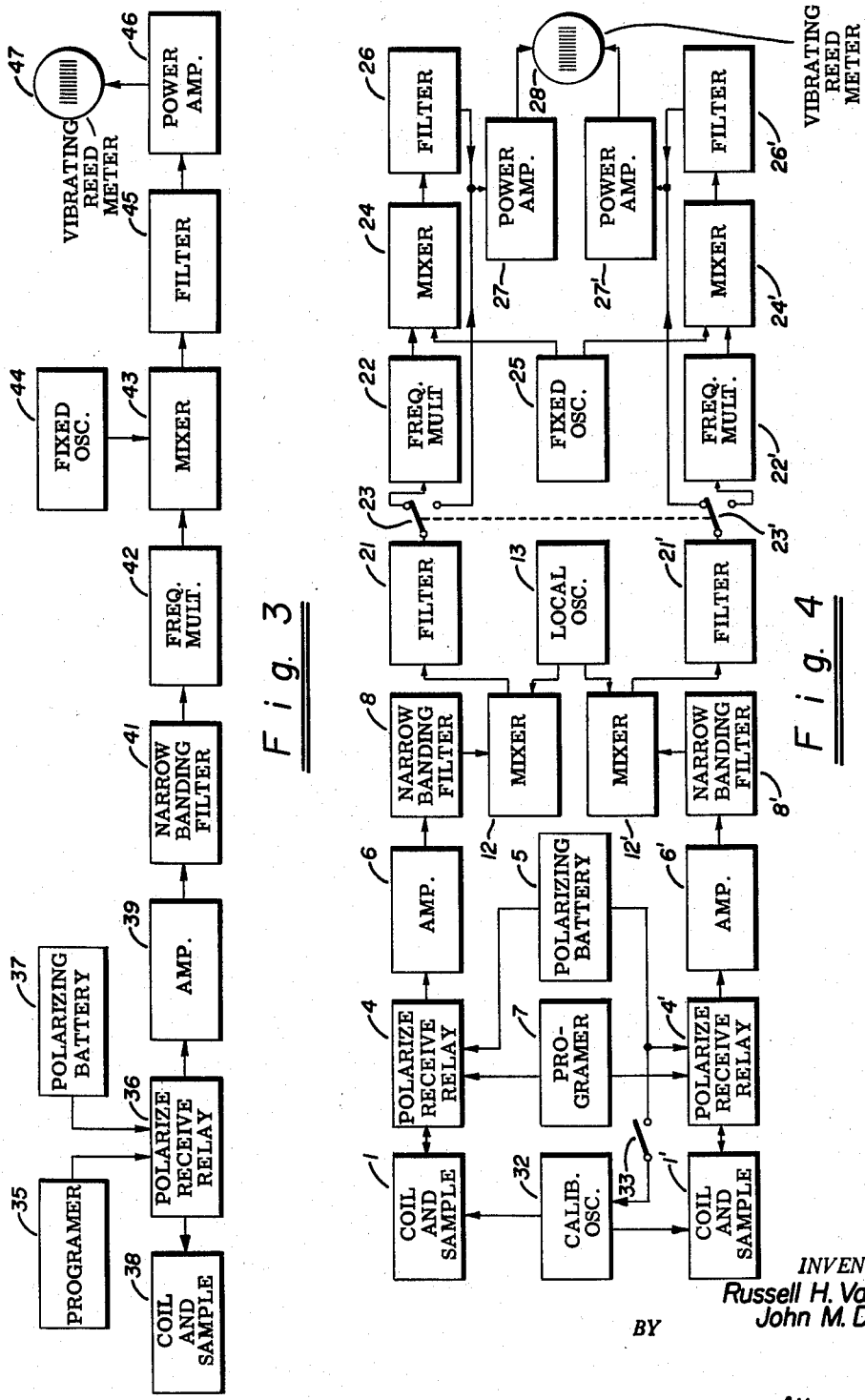

United States Patent Office 3,178,636
Patented Apr. 13, 1965

3,178,636
MAGNETIC FIELD MEASURING METHODS
AND APPARATUS
Russell H. Varian, Cupertino, and John M. Drake, Saratoga, Calif., assignors to Varian Associates, San Carlos, Calif., a corporation of California
Filed Aug. 14, 1956, Ser. No. 604,588
11 Claims. (Cl. 324—.5)

The present invention relates in general to magnetic field measuring and more specifically to novel improved free precession magnetic field measuring methods and apparatus useful, for example, in making geomagnetic surveys, prospecting, and for plotting magnetic fields.

Heretofore, magnetometers have been made which were light and compact enough to be carried by a person in the field. However, these prior art instruments have had severe limitations. Generally, if the instrument was rugged enough to stand the abuse in field use the instrument was relatively insensitive, for example, one rugged type of instrument would detect magnetic field anomalies in excess of 250 gamma.

Other more fragile instruments have been used in the field which have had sensitivities in the order of plus or minus 30 gamma. However, these instruments were designed to measure either the horizontal or vertical component of the earth's field but not both. Moreover, these more sensitive instruments were slow reading instruments. For example, the instruments were generally carried upon a tripod which was firmly set in the ground after which a sensing element was carefully leveled and oriented with respect to the plane of the earth's magnetic meridian. Only after time consuming and tedious preliminaries have been completed may a reading of the earth's field be taken and the reading will be accurate only if the instrument was properly temperature compensated, calibrated, leveled, oriented and the delicate mechanical mechanism was not damaged in being transported about the field.

The present invention utilizes the principles of gyromagnetic precession such as taught by Russell H. Varian in U.S. Patent Re. 23,769, issued January 12, 1954, entitled "Method and Means for Correlating Nuclear Properties of Atoms and Magnetic Fields." Certain improvements have been made in the gyromagnetic method for measuring magnetic fields which make the gyromagnetic method especially suitable for portable applications. These improvements form the subject matter of the present invention.

It is the principal object of the present invention to provide an improved magnetic field measuring method and apparatus which will allow the provision of an instrument which is extremely portable, compact, accurate and which will allow measurement of the magnetic field in a matter of seconds.

One feature of the present invention is a novel magnetometer method and apparatus wherein the precessional signal is compared to a standard signal to obtain a third signal which is lower in frequency and which may be readily measured to obtain a measure of the magnetic field.

Another feature of the present invention is a novel improved magnetometer method and apparatus wherein a frequency is derived which is a measure of the magnetic field and a vibrating reed frequency measuring means is utilized to measure this frequency to thereby obtain an indication of the magnetic field intensity.

Another feature of the present invention is a novel improved gradiometer method and apparatus wherein a plurality of novel magnetometer systems of the present invention are utilized to obtain signals which are a measure of the magnetic field intensity at the spaced apart locations, the signals then being compared to obtain a measure of the magnetic field gradient.

Another feature of the present invention is the provision of multiplier means whereby the low frequency signal which is a measure of the magnetic field intensity may be multiplied to a higher frequency to obtain a more precise measurement of the magnetic field intensity.

Another feature of the present invention is the provision of novel means for increasing the range of magnetic field measurements by affording means for changing the resonant frequencies of certain resonant circuits within the apparatus by certain discrete increments, as desired.

Another feature of the present invention is the provision of means associated with the means for changing the resonant frequency by discrete increments from a first resonant frequency to a new resonant frequency whereby the L-C versus frequency characteristics curves have substantially the same slope for both frequencies such that an additional incremental value of capacitance or inductance, as desired, will produce substantially the same frequency change at both frequencies.

Figure 2:
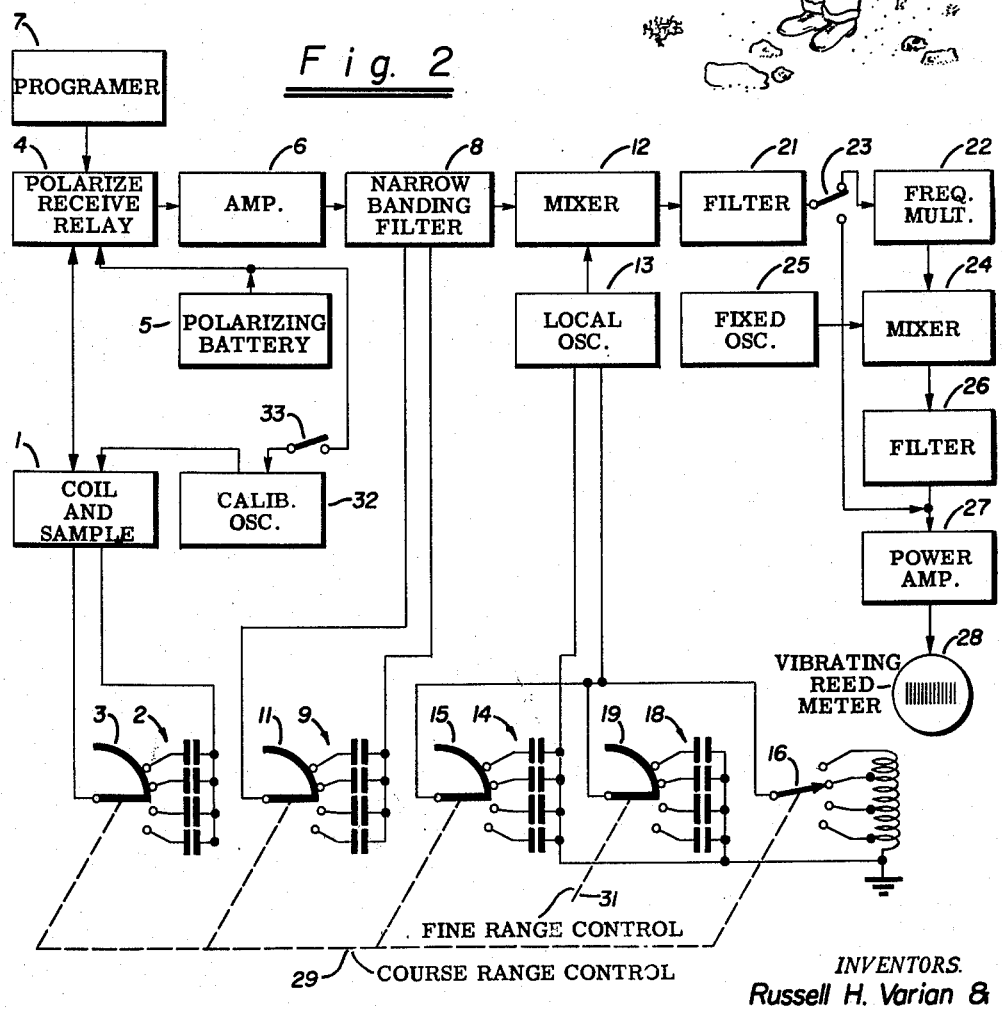

These and other features and advantages of the present invention will be more apparent after a perusal of the following specification taken in connection with the accompanying drawings wherein, FIG. 1 is a view of the man carrying one magnetometer apparatus of this invention, FIG. 2 is a block diagram of a novel magnetometer system embodying the present invention, FIG. 3 is a block diagram of a second magnetometer system embodying the present invention, and FIG. 4 is a block diagram of a novel gradiometer system embodying the present invention.

The novel systems of the present invention will now be described. Several embodiments are presented and each novel embodiment will be accompanied by a description of its operation.

Referring now to FIG. 1 there is shown a man carrying the novel, light-weight, compact, magnetic field measuring apparatus of the present invention.

Referring now to FIG. 2 there is shown in block diagram form the novel circuitry of a magnetometer embodiment of the present invention. A coil and sample 1 serve as the magnetic field sensing element. The coil comprises a coil of wire wound around a sample of matter which contains gyromagnetic bodies such as, for example, protons in water. The coil forms the inductive portion of a tuned resonant circuit. A bank of capacitors 2 which may be successively coupled to the coil by the rotation of a wiper blade 3 serves as the capacitive portion of the tuned circuit.

The coil serves a dual function. One function of the coil is to serve as the source of a polarizing magnetic field which polarizes the gyromagnetic bodies in a direction which is at some angle to the direction of the magnetic field which it is desired to measure. When the gyromagnetic bodies have been polarized the coil is de-energized and the magnetic field supported by the coil is allowed to collapse. After the polarizing field no longer exists the gyromagnetic bodies will precess in the magnetic field which it is desired to measure. The coil then serves a second function, namely, to detect the precession signal induced therein by the precessing gyromagnetic bodies.

A polarize-receive relay 4 serves to facilitate the dual function of the coil by first connecting a polarizing battery 5 to the coil to thereby energize the coil to produce the polarizing magnetic field. After a certain time has elasped and the gyromagnetic bodies have been polarized, the polarize-receive relay 4 shifts to the receive position thereby disconnecting the polarizing battery from the coil and at the same time connecting the coil to the input of an amplifier 6.

A programmer 7 serves to actuate the polarized receive relay 4. The programmer 7 may comprise either a two position switch, which is manually operated, or a stable multivibrator with a suitable time constant.

The gyromagnetic free precession signal is received in the tuned detector circuit comprising the coil and suitable capacitors selected from capacitor bank 2. After reception the precession signal is propagated through the polarize-receive relay 4 to the input of an amplifier 6 wherein the signal is amplified and fed to a narrow banding filter 8. Filter 8 serves to filter out extraneously induced signals and noise which accompany the amplified gyromagnetic precession signal. Narrow banding filter 8 is tunable in discrete frequency ranges by connecting into the filter successive capacitors from a bank of capacitors 9 through the intermediary of a wiper blade 11. The output of narrow banding filter 8 is fed to a mixer 12 wherein the gyromagnetic signal is mixed with the signal from a local oscillator 13.

The local oscillator 13 is tunable in discrete frequency ranges by means of successively connecting into the tank circuit of the oscillator 13 various capacitors from a bank of capacitors 14 via a wiper blade 15. In addition, a contactor 16 is provided such that discrete values of inductance may also be coupled into the turned circuit of local oscillator 13. The values of the capacitances and inductances that are successively connected are arranged such that the resonant frequency determined thereby occurs at a point on the L-C versus frequency characteristic curves, such that the L-C curve has substantially the same slope for each successive frequency. In this way a certain value of incremental capacitance will produce substantially the same frequency change over the various frequency ranges as determined by the position of wiper blade 15 and contactor 16.

A second bank of capacitors 18 are arranged to be successively connected into the tuned circuit of local oscillator 13 via a second wiper blade 19 to thereby obtain a fine range adjustment within each of the coarse range adjustments as determined by the positioning of wiper blade 15 and contactor 16. Since the values of inductance and capacitance associated with the coarse range adjustment were selected to give the same slope on the L-C versus frequency characteristic curves each capacitor of the fine range adjustment will produce substantially the same frequency change over each of the coarse frequency ranges.

The output of mixer 12 will contain sum and difference frequencies corresponding to the upper and lower side bands obtained by heterodyning the local oscillator and free precession signals. The local oscillator 13 is selected to have a frequency near the anticipated gyromagnetic frequecy such that the difference frequency will be a low frequency. A filter 21 is provided to filter out the unwanted carrier and the higher sideband signals.

The lower sideband signal, from the output of mixer 12, may be fed, for high sensitivity, to a frequency multiplier 22 via a two position switch 23. The frequency multiplier 22 multiplies the lower sideband by some suitable integer such as, for example, 10 and supplies the multiplied frequency to the input of a mixer 24. A second oscillator 25 which is set to oscillate at a certain fixed frequency supplies a signal to the mixer 24 for heterodyning with the multiplied signal from frequency multiplier 22.

The output of mixer 24 will contain sum and difference sidebands. The lower frequency sideband is selected by filtering out, in a filter 26, the unwanted higher sideband and carrier frequencies. The low frequency output of filter 26 is then fed to a power amplifier 27 which amplifies the signal and feeds it to a vibrating reed frequency meter 28.

The vibrating reed frequency meter 28 measures the frequency of the applied signal which is a measure of the magnetic field. The vibrating reed meter may be calibrated in units of magnetic field intensity, if desired. A vibrating reed type of frequency meter is especially suitable for the present application due to the transient nature of the gyromagnetic precessional signal. This type of meter will provide an almost instantaneous indication of the frequency where as other type meters such as moving coil type indicators are slow to react and difficult to determine the peak value.

A less sensitive measure of the magnetic field intensity may be obtained by placing switch 23 in the by-pass position whereby frequency multiplier 22, mixer 24, filter 26 and oscillator 25 are by-passed and the low frequency signal in the output of filter 21 is fed directly to the input of power amplifier 27 wherein it is amplified and applied to the vibrating reed frequency meter 28.

When measuring the earth's magnetic field intensity in the northern hemisphere it is expected that gyromagnetic precession frequencies, when using a water sample, will range from 1.5 kilocycles to 3.0 kilocycles. It is not practical for the tuned circuit, utilized for receiving the precession signal, to have a bandwidth wide enough to provide a flat response over this range of frequencies because the sensitivity of the coil is inversely proportional to its bandwidth. Therefore, the receiving tuned circuit has been made tunable in discrete increments of lesser bandwidth to cover the expected signal range. Likewise, the narrow banding filter 8 and the local oscillator 13 have been designed to have a series of discrete frequency ranges coersponding to the discrete frequency ranges of the tuned detector coil.

A coarse range control 29 provides a mechanical linkage serving to link together the three wiper blades 3, 11, and 15 and contactor 16 whereby the resonant frequency of the receiving circuit, the narrow banding filter, and the local oscillator 13 may be synchronously tuned to the same frequency range. In addition, a fine range control 31 is provided for switching into the local oscillator 13 via wiper blade 19 discrete values of capacitance from capacitor bank 18 to thereby vary the frequency of local oscillator 13 in equal increments within the particular coarse range selection. The fine range control 31 is used in conjunction with the more sensitive field measurement obtained by the use of frequency multiplier 22 and the associated elements. The range controls 29 and 31 may be calibrated in units of magnetic field intensity, if desired, such that the total magnetic field intensity may be easily read by adding the readings of the vibrating reed meter to the coarse and fine range control readings.

A calibration oscillator 32 with a known fixed frequency is provided which derives its power through an on-off switch 33 from the polarizing battery 5. Other power absorbing units of the apparatus, with the exception of oscillators 13 and 25, also derive their power from the polarize-receive battery. Oscillators 13 and 25 derive their power from a separate battery, not shown, to prevent frequency changes due to fluctuations of the power taken from the polarizing battery 5.

The output of the calibration oscillator is coupled into the tuned resonant detecting circuit to simulate the gyromagnetic resonance signal. The local oscillator 13 may then be calibrated and adjusted as required by comparing its frequency with the known calibration frequency. When calibrating the apparatus the polarize-receive relay is operated in the receive position.

Although several banks of capacitors have been provided for extending the range of the magnetometer apparatus these range adjustments are not necessary if the instrument is to be used for magnetic field intensities which do not vary greatly from a given norm.

With the sacrifice of some sensitivity the elements comprising frequency multiplier 22, mixer 24, oscillator 25, filter 26 and the associated fine range elements 18, 19 and 31 may be omitted from the apparatus. In addition, calibration oscillator 32 is not necessary to the proper operation of the apparatus and may be deleted from the system, as desired.

In a practical instrument the coil and sample 1 should be disposed remote from any local magnetic perturbation. Thus, in a preferred embodiment of the present invention the coil and sample are adapted to be carried behind the operator's head (see FIG. 1) whereas the rest of the elements making up the magnetometer apparatus are carried within a conductive metallic housing 34 as of, for example, aluminum thereby providing an electromagnetic shield of the elements from external electromagnetic disturbances.

Referring now to FIG. 3 there is shown another embodiment of the present invention. The construction and operation of the apparatus of FIG. 3 is similar to that shown in FIG. 2. More specifically, the apparatus of FIG. 3 is identical with that of FIG. 2 up to the point in the circuit where the gyromagnetic signal leaves the narrow banding filter. That is, in operation, programer 35 controls the operation of a polarize-receive relay 36 to successively energize the coil surrounding the gyromagnetic sample by connecting it to a polarizing battery 37 to polarize the sample. After the sample is polarized the relay 36 shifts to the receive position and receives the gyromagnetic signal coming from coil and sample 38. The gyromagnetic signal is fed to the input of amplifier 39 wherein it is amplified and fed to a narrow banding filter 41.

Upon passing through the narrow banding filter 41 the gyromagnetic signal is fed to a frequency multiplier 42 wherein the gyromatic frequency is multiplied by a suitable factor such as, for example, 10. The multiplied signal is then fed to a mixer 43 wherein it is heterodyned with a known frequency from a local oscillator 44. Sum and difference frequency sidebands will be formed in the output of mixer 43 and the lower sideband or difference frequency is selected by a filter 45 and fed to the input of a power amplifier 46 wherein it is amplified and fed to a vibrating reed meter 47.

As was described in relation to FIG. 2 banks of capacitors may be provided for extending the range of the present instrument. Moreover, the local oscillator and vibrating reed meter may be calibrated in units of field intensity to thereby facilitate reading of the magnetic field. A calibrating oscillator may be utilized with this embodiment in the same manner as shown in FIG. 2.

An advantage of the present embodiment over the embodiment shown in FIG. 2 is that for the measurement of magnetic field intensities lying within a narrow range the present circuit eliminates the need of a second local oscillator, mixer, and filter.

Referring now to FIG. 4 there is shown another embodiment of the present invention wherein two of the magnetometer embodiments as shown in FIG. 2 have been combined to form a novel gradiometer apparatus. This novel gradiometer embodiment is comprised of two magnetometer systems that are substantially identical to the magnetometer system of FIG. 2. Accordingly, corresponding parts have been numbered the same in both FIGS. 2 and 4. Certain elements, namely, calibration oscillator 32, programer 7, polarizing battery 5, local oscillator 13, fixed oscillator 25 and vibrating reed meter 27 are common elements to both magnetometer systems. Primed numerals have been used to designate the elements comprising one set of the dual magnetometer systems thereby distinguishing one magnetometer system from the other.

In a preferred embodiment of the gradiometer apparatus of FIG. 4 the coil and sample units 1 and 1' are disposed remote from the remainder of the gradiometer apparatus such as to be out of the influence of any magnetic perturbation caused by the instrument itself. In addition, the individual coil and sample elements 1 and 1' respectively are spatially separated by a given distance. The difference in magnetic field between the two samples will be measured, thus, giving a measure of the magnetic field gradient between the samples.

In operation each of the two magnetometers comprising the gradiometer functions exactly as the single magnetometer described with relation to FIG. 2. The outputs of the power amplifiers 27 and 27' will contain a signal which is a measure of the magnetic field intensity at the respective spatially separated gyromagnetic samples. The two frequencies are then fed to a vibrating reed meter 28 which will indicate both frequencies. The operator then observes both frequencies and subtracts one reading from the other to obtain a reading of the magnetic field gradient between the spatially separated samples.

The operating range of the gradiometer embodiment may be increased by the addition of coarse and fine range controls and associated elements as shown in FIG. 2.

In addition, two novel magnetometer systems like the system shown and described in FIG. 3 may be substituted for the separate magnetometer components of the novel gradiometer of FIG. 4. Although the present invention has been described as it is utilized in a magnetic field measuring system employing the principles of gyromagnetic free precession to sense the magnetic field intensity, it is equally well adaptable to other gyromagnetic field sensing devices. In other words, the present system is not limited in scope to the free precession method. For example, the field sensing element may comprise a gyromagnetic oscillator or other type of gyromagnetic field sensing element.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. The method of measuring a magnetic field utilizing the gyromagnetic precession of gyromagnetic bodies disposed within the field comprising the step of producing gyromagnetic precession of the gyromagnetic bodies within the magnetic field it is desired to measure, deriving a first signal in variable accordance with the precession of the gyromagnetic bodies, comparing the first signal with a standard signal which is variable timewise in known separated predetermined discrete frequency increments to obtain a second signal in variable accordance with the magnetic field, multiplying the second signal by a certain factor to obtain a third signal in variable accordance with the magnetic field, comparing the third signal with a second standard signal to obtain a fourth signal in variable accordance with the magnetic field and measuring the fourth signal to obtain a measure of the magnetic field intensity.

2. The method according to claim 1 wherein the steps of comparing the first signal with a first standard signal and the step of comparing the third signal with a second standard signal to obtain a fourth signal comprises the steps of heterodyning the first signal with a first standard signal to obtain a difference signal in variable accordance with the magnetic field, and heterodyning the third signal with a second standard signal to obtain a fourth difference signal in variable accordance with the magnetic field it is desired to measure.

3. An apparatus for measuring a magnetic field utilizing the gyromagnetic precession of gyromagnetic bodies disposed within the field comprising means for producing precession of the gyromagnetic bodies within the magnetic field it is desired to measure, means for deriving a first signal in variable accordance with the precession of the gyromagnetic bodies, means for comparing the first signal with a first standard signal variable timewise in known predetermined discrete frequency increments to obtain a second signal in variable accordance with the gyromagnetic precession, multiplying means for multiplying the second signal by a certain factor to obtain a third signal in variable accordance with the gyromagnetic precession, comparing means for comparing the third signal with a second standard signal to obtain a fourth signal in variable accordance with the gyromagnetic precession, and measuring means for measuring the frequency of the fourth signal to thereby obtain a measure of the magnetic field intensity.

4. Apparatus according to claim 3 wherein said comparing means comprises heterodyning means for heterodyning the first signal with a first standard signal and for heterodyning the third signal with a second standard signal to thereby obtain second and fourth signals respectively in variable accordance with the precession of the gyromagnetic bodies.

5. Apparatus for measuring a magnetic field utilizing the gyromagnetic precession of gyromagnetic bodies disposed within the field comprising electrically conducting coil means adapted to be positioned with the longitudinal axis thereof at an angle with respect to the direction of the magnetic field, current source means adapted to be intermittently connected to said coil means for intermittently energizing said coil means to thereby produce a polarizing magnetic field within said coil means for intermittently polarizing the gyromagnetic bodies at an angle with respect to the magnetic field it is desired to measure, said coil means further serving to detect the free gyromagnetic precession of the gyromagnetic bodies about the magnetic field it is desired to measure, amplifier means adapted to be connected intermittently to said coil means for amplifying the gyromagnetic free precession signal, local oscillator means for producing a known stable standard frequency, mixer means for heterodyning the free precessional signal against the standard frequecy obtained from the local oscillator means to thereby obtain a low frequency difference signal in variable accordance with the gyromagnetic precession frequency, second amplifier means for amplifying the difference frequency signal, means for changing from time to time the resonant frequency of said local oscillator means in discrete increments whereby the magnetic field measuring range may be changed in discrete increments as desired, and vibrating reed frequency meter means for substantially instantaneously measuring the difference frequency signal to thereby obtain a measure of the magnetic field intensity.

6. A portable magnetometer for measuring the field strength of weak nagnetic fields including, means for polarizing an ensemble of gyromagnetic bodies at an angle to the direction of the magnetic field which is to be measured, means for removing the polarizing magnetic field to allow the gyromagnetic bodies to freely precess with a characteristic transient decaying exponential amplitude and at a frequency determinative of the weak magnetic field intensity, means for receiving from said freely precessing bodies a precession signal and producing a transient output signal of a frequency determinative of the weak magnetc field intensity and of a decaying exponential amplitude, and a vibrating reed frequency meter operatively connected to said receiving means and responsive to said transient output signal for measuring the frequency of said output signal to yield a measure of the weak magnetic field.

7. The apparatus according to claim 6 wherein said receiver means includes, means forming a local A.C. source of predetermined frequency, means for heterodyning said free transient decaying precessional signal with said local A.C. source of predetermined frequency to produce a lower difference frequency transient exponential decaying output signal of a frequency determinative of the magnetic field intensity and within the frequency range of said vibrating reed meter for frequency measurement by said vibrating reed frequency meter.

8. The apparatus according to claim 6 wherein said receiver means includes, an amplifier for amplifying the free precessional signal and a tunable narrow band filter for filtering noise from the amplified free precession signal which is to be measured.

9. The apparatus according to claim 6 wherein said receiver means includes, a tunable narrow band filter, a local A.C. source of predetermined frequency for heterodyning with said free precessional signal to produce a lower difference frequency transient exponential decaying output signal, and means for tuning said filter and said A.C. source in concert.

10. The apparatus according to claim 7, including, means for changing the frequency of said local A.C. source substantially only in discrete frequency displaced increments for maintaining the difference precessional signal within the frequency range of said vibrating reed meter.

11. A tunable electrical resonant circuit, tunable over a band of frequencies in discrete frequency increments including, a capacitor and an inductor connected in circuit together to form a resonant circuit, said capacitor being made up of a plurality of discrete capacitive elements connected in circuit with each other, said inductor being made up of a plurality of discrete inductive elements connected in circuit with each other, and means for changing the resonant frequency of said resonant circuit from a first resonant frequency $\omega_1$ to a second resonant frequency $\omega_2$ such that the inductance-capacitance versus frequency curve at the point corresponding to the second resonant frequency $\omega_2$ has substantially the same slope as said curve at the point of the first resonant frequency $\omega_1$ by changing in concert in a predetermined manner the number of said capacitive and inductive elements connected together in circuit, whereby an incremental change, smaller than the aforementioned changes in one of said capacitive or inductive elements, will produce substantially the same frequency change at both frequencies $\omega_1$ and $\omega_2$.

References Cited in the file of this patent

UNITED STATES PATENTS

| 2,089,695 | Fyler | Aug. 10, 1937 |
| 2,337,328 | Hathaway | Dec. 21, 1943 |
| 2,422,134 | Sanders | June 10, 1947 |
| 2,447,191 | Lingel | Aug. 17, 1948 |
| 2,484,824 | Hansel | Oct. 18, 1949 |
| 2,501,154 | Berman | Mar. 21, 1950 |
| 2,520,867 | Werner et al. | Aug. 29, 1950 |
| 2,617,938 | Haner | Nov. 11, 1952 |
| 2,772,391 | Mackey | Nov. 27, 1956 |

FOREIGN PATENTS

| 746,114 | Great Britain | Mar. 7, 1956 |

OTHER REFERENCES

Review of Scientific Instruments, June 1949, vol. 20, No. 6, pp. 401–402.

Thomas: Electronics—Issue of January 1952, pp. 114–118.

Waters et al., Geophysical Prospecting, vol. 4, No. 1, March 1956, pp. 1 to 9.